US011609611B2

(12) United States Patent
Lin

(10) Patent No.: US 11,609,611 B2
(45) Date of Patent: Mar. 21, 2023

(54) COVER FOR ELECTRONIC DEVICE WITH FLEXIBLE DISPLAY

(71) Applicant: GOOGLE LLC, Mountain View, CA (US)

(72) Inventor: Tsung Peng Lin, Taipei (TW)

(73) Assignee: Google LLC, Mountain View, CA (US)

( * ) Notice: Subject to any disclaimer, the term of this patent is extended or adjusted under 35 U.S.C. 154(b) by 362 days.

(21) Appl. No.: 16/188,640

(22) Filed: Nov. 13, 2018

(65) Prior Publication Data

US 2020/0150723 A1    May 14, 2020

(51) Int. Cl.
*G06F 1/16* (2006.01)
(52) U.S. Cl.
CPC .......... *G06F 1/1652* (2013.01); *G06F 1/1616* (2013.01); *G06F 1/1624* (2013.01); *G06F 1/1681* (2013.01)
(58) Field of Classification Search
CPC .... G06F 1/1624; G06F 1/1681; G06F 1/1641; G06F 1/1652; G06F 1/1601; G06F 1/00–3296; G06F 1/1616; G06F 1/16–1698; G09G 2380/02; H04M 1/0235; H04M 1/0268; H04M 1/0216; H04M 1/00–82; H04M 1/2014; H01L 2251/5338; H01L 29/7869; H01L 51/5237; G09F 9/301; H05K 1/028
USPC ............................... 361/679.27, 679.39, 727
See application file for complete search history.

(56) References Cited

U.S. PATENT DOCUMENTS

| | | | |
|---|---|---|---|
| 9,195,272 B2 | 11/2015 | OBrien | |
| 9,798,359 B2 | 10/2017 | Seo et al. | |
| 9,971,382 B2 | 5/2018 | Ahrens et al. | |
| 10,013,020 B2 | 7/2018 | Hong et al. | |
| 10,140,018 B2 | 11/2018 | Kim et al. | |
| 2014/0065326 A1 | 3/2014 | Lee et al. | |
| 2015/0062927 A1 | 3/2015 | Hirakata et al. | |
| 2015/0241925 A1* | 8/2015 | Seo ....................... | G06F 1/1681 |
| | | | 361/679.27 |

(Continued)

FOREIGN PATENT DOCUMENTS

| CN | 102902308 A | 1/2013 |
|---|---|---|
| CN | 105491193 A | 4/2016 |

(Continued)

OTHER PUBLICATIONS

International Search Report and Written Opinion for PCT Application No. PCT/US2019/054493, dated Sep. 28, 2020, 11 pages.

(Continued)

*Primary Examiner* — Amr A Awad
*Assistant Examiner* — Aaron Midkiff
(74) *Attorney, Agent, or Firm* — Shumaker & Sieffert, P.A.

(57) ABSTRACT

An electronic device includes: a processor; a memory; first and second body portions coupled to each other by a hinge having a single rotation axis; a flexible display attached to at least one of the first or second body portions, the flexible display having parallel edges, the first body portion covering first opposing portions of the parallel edges, the second body portion covering second opposing portions of the parallel edges; and a flexible cover attached to the first body portion, the flexible cover extending to the second body portion and covering third opposing portions of the parallel edges.

16 Claims, 9 Drawing Sheets

(56) References Cited

U.S. PATENT DOCUMENTS

| | | | |
|---|---|---|---|
| 2015/0261259 A1* | 9/2015 | Endo | G02F 1/13338 |
| | | | 361/679.06 |
| 2015/0366089 A1 | 12/2015 | Park et al. | |
| 2016/0070303 A1* | 3/2016 | Lee | G06F 1/1652 |
| | | | 361/679.27 |
| 2017/0006725 A1 | 1/2017 | Ahn et al. | |
| 2017/0243526 A1 | 8/2017 | Lim | |
| 2018/0110139 A1* | 4/2018 | Seo | H04M 1/0216 |

FOREIGN PATENT DOCUMENTS

| | | |
|---|---|---|
| CN | 105900037 A | 8/2016 |
| CN | 107567608 A | 1/2018 |
| KR | 20140090921 A | 7/2014 |

OTHER PUBLICATIONS

First Office Action and Search Report, and translation thereof, from counterpart Chinese Application No. 201980073361.X dated Jan. 20, 2022, 17 pp.

International Preliminary Report on Patentability from International Application No. PCT/US2019/054493 dated May 18, 2021, 9 pp.

Response to Communication Pursuant to Rules 161(1) and 162 EPC dated May 7, 2021, from counterpart European Application No. 19884855.8, filed Nov. 3, 2021, 19 pp.

Second Office Action from counterpart Chinese Application No. 201980073361.X dated Sep. 19, 2022, 21 pp.

Communication pursuant to Article 94(3) EPC from counterpart European Application No. 19884855.8 dated Nov. 3, 2022, 12 pp.

Notice of Intent to Grant, and translation thereof, from counterpart Chinese Application No. 201980073361.X dated Jan. 4, 2023, 4 pp.

* cited by examiner

COVER FOR ELECTRONIC DEVICE WITH FLEXIBLE DISPLAY

TECHNICAL FIELD

This document relates, generally, to a cover for an electronic device with a flexible display.

BACKGROUND

Smartphones or other electronic devices are sometimes designed so that an enclosure is formed by a housing and a display of the electronic device joined to each other. New types of displays including flexible displays have been introduced. This can place additional demands on the enclosure.

SUMMARY

In a first aspect, an electronic device includes: a processor; a memory; first and second body portions coupled to each other by a hinge having a single rotation axis; a flexible display attached to at least one of the first or second body portions, the flexible display having parallel edges, the first body portion covering first opposing portions of the parallel edges, the second body portion covering second opposing portions of the parallel edges; and a flexible cover attached to the first body portion, the flexible cover extending to the second body portion and covering third opposing portions of the parallel edges.

Implementations can include any or all of the following features. The flexible cover is attached to the second body portion. The flexible cover is attached to the second body portion by a slot on one of the second body portion or the flexible cover, the slot engaged with a protrusion on another of the second body portion or the flexible cover. The slot is on the second body portion and the protrusion is on the flexible cover. The protrusion includes a first boss, the electronic device further comprising a slider attached to the first boss. A portion of the second body portion is sandwiched between the flexible cover and the slider. The electronic device further comprises a second boss on the slider, the second boss concentric with the first boss. The electronic device further comprises a bolt that engages with the first boss to attach the slider. The electronic device further comprises a spring having a first end engaged with the protrusion and a second end connected to the second body portion. The flexible cover comprises a cover member and a slider structure, the slider structure coupled to the second body portion. The electronic device further comprises a slider attached to the slider structure, a portion of the second body portion sandwiched between the slider structure and the slider. The first body portion comprises: a first member extending parallel to and supporting the first opposing portions of the parallel edges; and a first cover adjacent the first member, the first member and the first cover forming a slot for the first opposing portions of the parallel edges. The second body portion comprises: a second member extending parallel to and supporting the second opposing portions of the parallel edges; and a second cover adjacent the second member, the second member and the second cover forming a slot for the second opposing portions of the parallel edges.

In a second aspect, an electronic device includes: a processor; a memory; first and second body portions coupled to each other by a hinge having a single rotation axis; a flexible display attached to at least one of the first or second body portions, the flexible display having parallel edges, the first body portion covering first opposing portions of the parallel edges, the second body portion covering second opposing portions of the parallel edges; and a flexible cover attached to the second body portion by a slot on one of the second body portion or the flexible cover, the slot engaged with a protrusion on another of the second body portion or the flexible cover, the flexible cover extending to the first body portion and covering third opposing portions of the parallel edges.

Implementations can include any or all of the following features. The slot is on the second body portion and the protrusion is on the cover. The protrusion has a first boss, the electronic device further comprising a slider attached to the first boss. A portion of the second body portion is sandwiched between the cover and the slider. The electronic device further comprises a second boss on the slider, the second boss concentric with the first boss. The electronic device further comprises The electronic device further comprises a bolt that engages with the first boss to attach the slider. The electronic device further comprises a spring having a first end engaged with the protrusion and a second end connected to the second body portion.

BRIEF DESCRIPTION OF DRAWINGS

Like reference symbols in the various drawings indicate like elements.

DETAILED DESCRIPTION

This document describes examples of electronic devices having flexible displays to facilitate folding and unfolding. In some implementations, a flexible cover bridges a gap between hinged body portions of the electronic device. For example, the flexible cover can have an adjustable length that covers a gap along the flexible display both in closed and open states of the electronic device.

Figure 1:
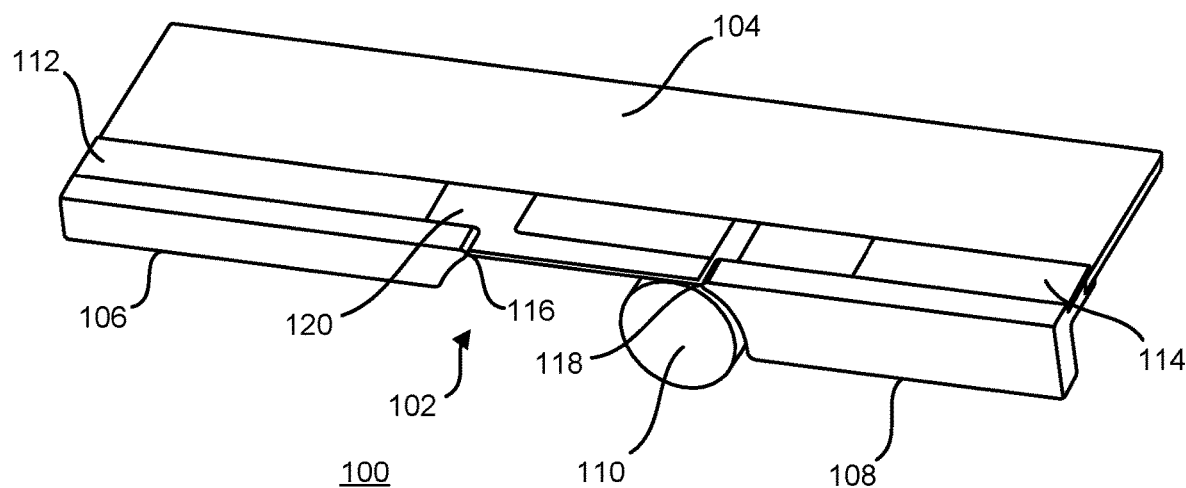
FIG. 1 shows an example of a portion of an electronic device in an open state.

FIG. 1 shows an example of a portion of an electronic device 100 in an open state. The electronic device 100 can be used together with one or more other examples described elsewhere herein. The electronic device 100 can be implemented based on some or all examples described with reference to FIG. 9. For example, the electronic device 100 can include the processor 902 and/or 952. As another example, the electronic device 100 can include the memory 904 and/or 964.

Here, only a portion of the electronic device 100 is shown for simplicity. Particularly, a portion of the electronic device 100 at a hinge area 102 is shown. In some implementations, the electronic device 100 can have an essentially symmetric form factor. For example, the electronic device 100 can have another hinge area (not shown) that from a structural standpoint is essentially a mirror image of the hinge area 102.

The electronic device 100 includes a flexible display 104. The flexible display 104 can include one or more substrates that are electronically controllable to present content on the flexible display 104. The flexible display 104 can include an array of individually energizable elements that can selectively be activated to form visual output (e.g., text, symbols, and/or images). For example, the flexible display 104 can include an organic light-emitting diode (OLED) display. As another example, the flexible display 104 can operate based on one or more of the technologies that are sometimes referred to as electronic paper, such technology being implemented in a substrate of sufficient flexibility to facilitate bending of the flexible display 104.

The electronic device 100 includes a body portion 106 and a body portion 108. The body portions 106 and 108 can be made of the same or different material(s). For example, the body portion 106 and/or 108 can include metal (e.g., an aluminum alloy) and/or a polymer material (e.g., a thermoplastic material). The body portions 106 and 108 can be manufactured by any suitable process, including, but not limited to, by machining, casting, and/or molding.

The electronic device 100 includes a hinge 110 that hinges the body portions 106 and 108 to each other. The hinging using the hinge 110 can based on any of multiple approaches. In some implementations, the hinge 110 is attached to a plate and to one of the body portions 106 and 108. For example, the hinge 110 can be mounted on the plate and on the body portion 108. The plate can be slidingly coupled to the body portion 106 to facilitate relative sliding motion between the body portion 106 and the plate. This can allow the body portion 106 to slide relative to other structures of the electronic device 100, including, but not limited to, the body portion 108 and/or the hinge 110. The hinge 110 has a single rotation axis allowing the electronic device to be placed in any of multiple states, including, but not limited to, an open state (e.g., as shown in FIG. 1) or a closed state. The hinge 310 can include a knuckle that forms a housing with a smooth cylindrical inside, the knuckle configured to allow rotation of a pin relative to the knuckle.

The electronic device 100 here includes a cover 112 that is mounted on the body portion 106, and a cover 114 that is mounted on the body portion 108. The cover 112 can serve to bridge a border (e.g., that may have a small gap) between the flexible display 104 and the body portion 106. Similarly, the cover 114 can serve to bridge a border (e.g., that may have a small gap) between the flexible display 104 and the body portion 108.

The body portion 106 has an edge 116, and the body portion 108 has an edge 118. The edges 116 and 118 may face each other, with a gap in between, when the electronic device 100 is in the open state (e.g., as shown in FIG. 1). The electronic device 100 includes a flexible cover 120 that may be attached to at least one of the body portions 106 or 108. Here, the flexible cover 120 is attached to at least the body portion 106 and extends to the body portion 108.

The covers 112 and 114, and the flexible cover 120, can be made from any suitable material. In some implementations, the covers 112 and 114 is made from (the same or different) synthetic materials, including, but not limited to, relatively rigid polymer material(s). For example, the cover 112 and/or 114 may be made from a hard plastic material. In some implementations, the flexible cover 120 is made from a relatively flexible material (e.g., an elastic material) that may be folded substantially in half without permanent deformation. For example, a relatively soft plastic material may be used for the flexible cover 120.

The electronic device 100 is an example of an electronic device that includes: a processor (e.g., the processor 902 or 952 in FIG. 9); a memory (e.g., the memory 904 or 964 in FIG. 9); first and second body portions (e.g., the body portions 106 and 108) coupled to each other by a hinge (e.g., the hinge 110) having a single rotation axis; a flexible display (e.g., the flexible display 104) attached to at least one of the first or second body portions, the flexible display having parallel edges, the first body portion covering first opposing portions of the parallel edges, the second body portion covering second opposing portions of the parallel edges; and a flexible cover (e.g., the flexible cover 120) attached to the first body portion, the flexible cover extending to the second body portion and covering third opposing portions of the parallel edges.

Figure 2:
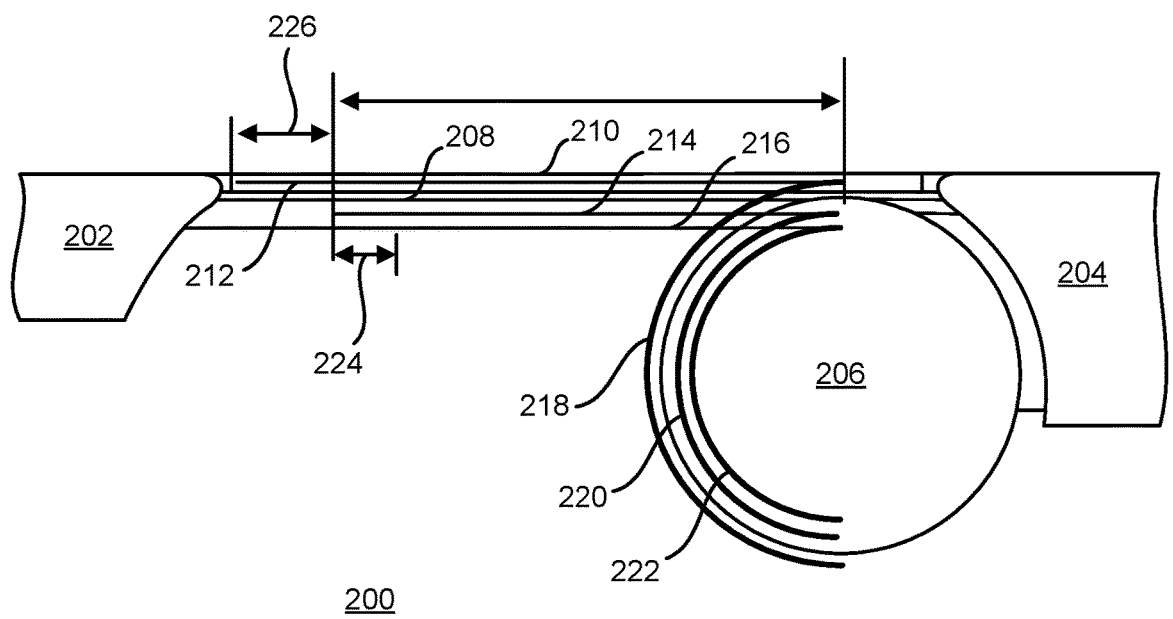
FIG. 2 schematically shows a cross-section of an example of a portion of an electronic device.

FIG. 2 schematically shows a cross-section of an example of a portion of an electronic device 200. The electronic device 200 can be used together with one or more other examples described elsewhere herein. The electronic device 200 can be implemented based on some or all examples described with reference o FIG. 9.

The electronic device 200 includes a body portion 202 and a body portion 204 that are coupled by a hinge 206. The electronic device 200 includes a flexible display 208, of which a portion is coupled to the body portion 202, and another portion is coupled to the body portion 204. The electronic device 200 is currently in an open state. For example, the flexible display 208 currently has a planar (e.g., unfolded) configuration. The electronic device 200 includes a flexible cover 210 that extends between the body portions 202 and 204. In some implementations, the flexible cover 210 can be considered a decorative cover for a space between the body portions 202 and 204. For example, the flexible cover 120 (FIG. 1) can be used as the flexible cover 210.

The flexible cover 210, the flexible display 208, and the hinge 206 can have different neutral axes compared to each other. The neutral axis can correspond to an axis in a cross section when no longitudinal stresses or strains exist. Here, the flexible cover 210 has a neutral axis 212, the flexible display 208 has a neutral axis 214, and the hinge 206 has a neutral axis 216. The neutral axes 212, 214, and 216 are positioned at different radiuses from a center of the hinge 206.

Each of the flexible cover 210, the flexible display 208, and the hinge 206 can have a corresponding arc when the electronic device 200 is brought towards or into a closed state. Each arc corresponds to a circle segment having the same radius, and length, as the corresponding neutral axis. Here, the neutral axis 212 has an arc 218, the neutral axis 214 has an arc 220, and the neutral axis 216 has an arc 222. A distance 224 corresponds to the difference between the neutral axis 214 and the neutral axis 216. For example, the distance 224 corresponds to the displacement of the body portion 202 between the open position (e.g., as shown) and the closed position.

The length of the neutral axis 214 can be considered the fit length of the flexible cover 210. A distance 226 corresponds to the difference between the neutral axis 212 and the neutral axis 214. The flexible cover 210 can accommodate the distance 226 in transitioning between the open and closed states, for example as described below.

Figure 3:
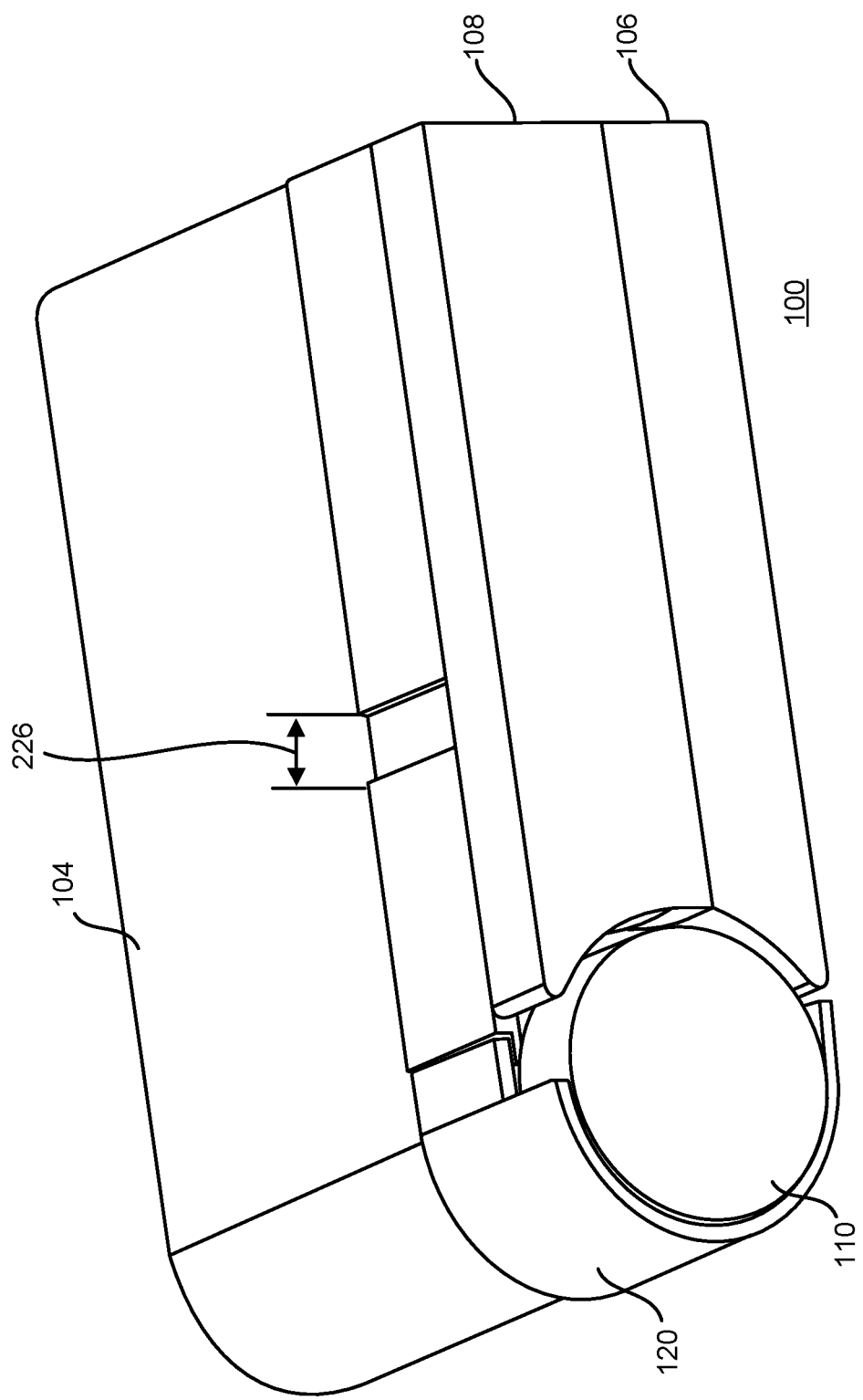
FIG. 3 shows an example of a portion of the electronic device in FIG. 1 in a closed state.

FIG. 3 shows an example of a portion of the electronic device 100 in FIG. 1 in a closed state. Here, relative rotation between the body portions 106 and 108 about the hinge 110 has brought the electronic device 100 into the closed state, where the body portions 106 and 108 are abutting each other. The flexible display 104 and the flexible cover 120 are flexed accordingly. The distance 226 described with reference to FIG. 2 is here shown between an end of the flexible cover 120 and a part of the body portion 108.

Figure 4A:
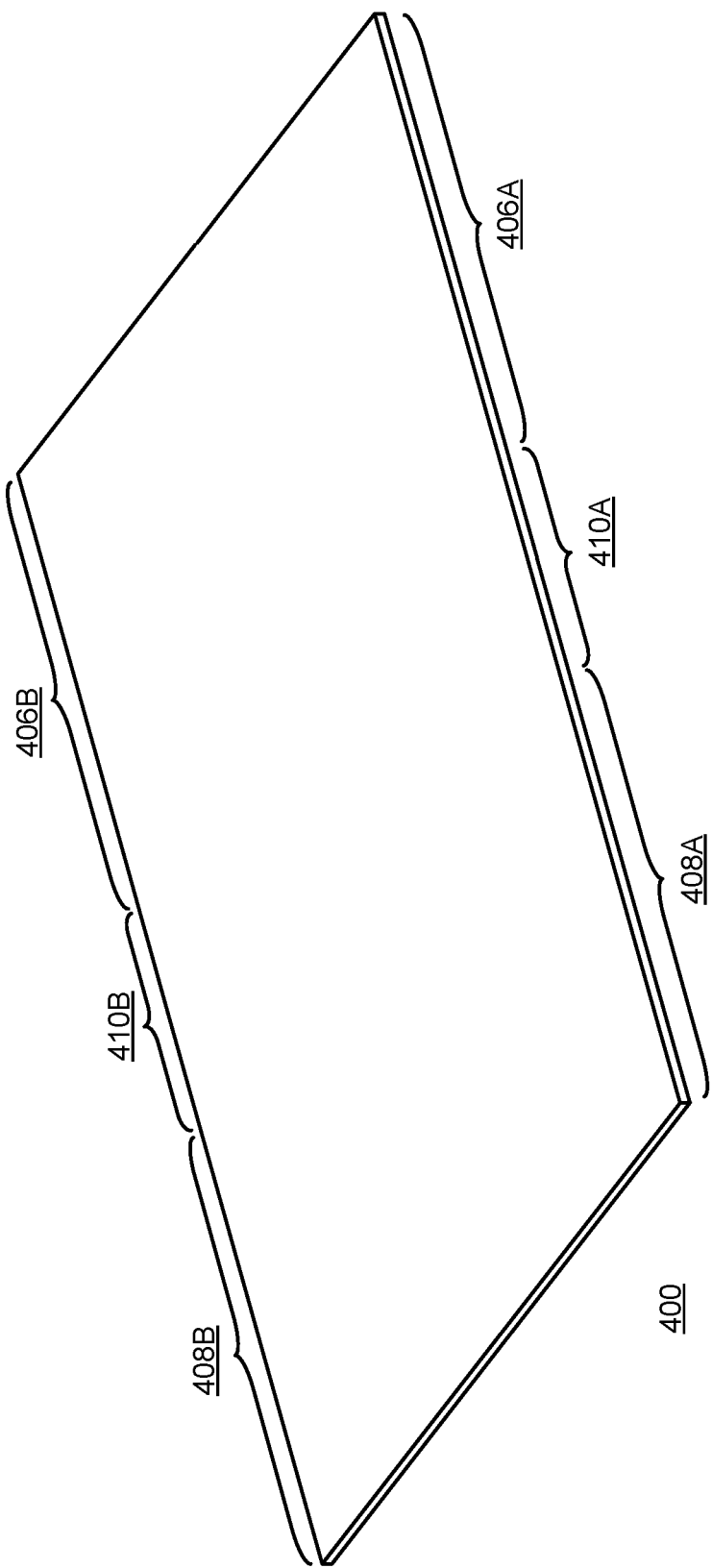
FIGS. 4A-B schematically show an example of a flexible display in a planar state and in a folded state, respectively.
Figure 4B:
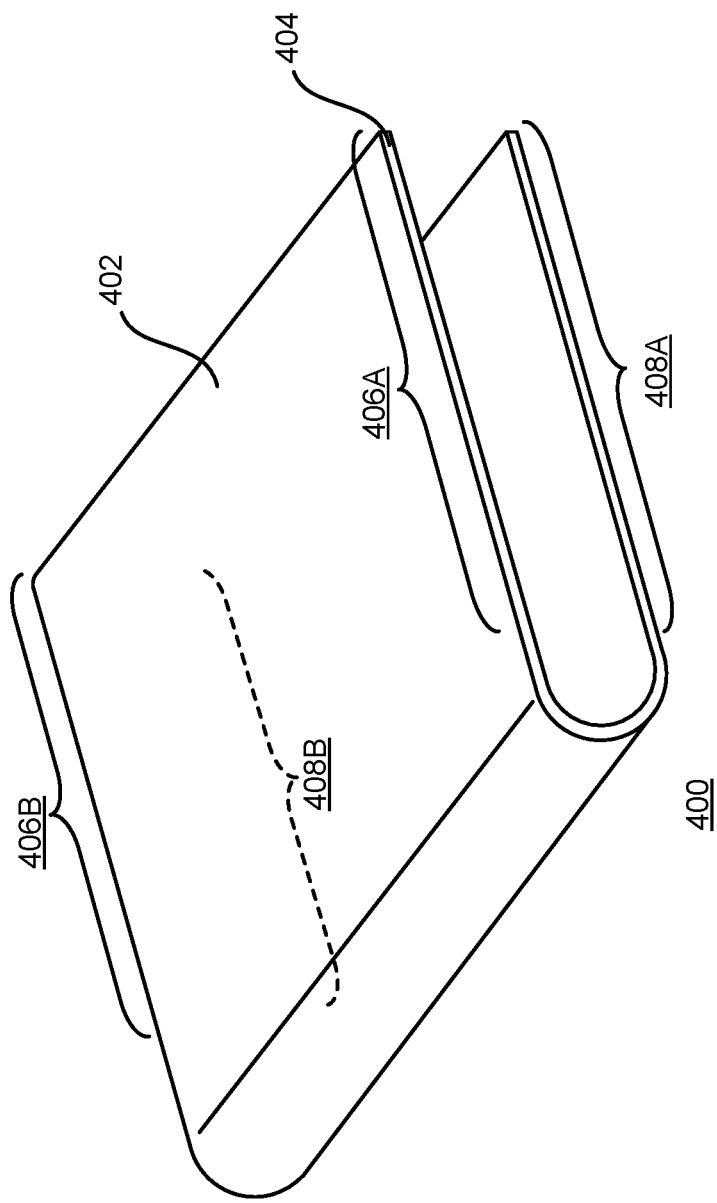

FIGS. 4A-B schematically show an example of a flexible display 400 in a planar state and in a folded state, respectively. The flexible display 400 can be used together with one or more other examples described elsewhere herein. The flexible display 400 can be implemented based on some or all examples described with reference to FIG. 9. The flexible display 400 is here shown without other components of an electronic device (e.g., a processor, memory, and other components) for simplicity.

The flexible display 400 has a display surface 402 which is where content may be presented (e.g., by way of using some or all individually energizable elements) so as to display information to a user. The display surface may be considered the active display area of the flexible display 400 and may extend substantially along an entire length, and along an entire width, of the flexible display 400. Adjacent the display surface 402, the flexible display has edges 404 which may not be considered part of the active display area of the flexible display 400. When the flexible display 400 has a polygon shape (e.g., a rectangle), some of the edges 404 are parallel to each other. For example, the edge closest to the viewer in FIG. 4B can be considered parallel to the edge that is farthest from the viewer. Thus, these edges can be considered parallel edges. Here, a portion 406A of the parallel edges is opposite a portion 406B on the other side of the display surface 402. Thus, the portions 406A-B are opposing portions of the parallel edges. Similarly, a portion 408A of the parallel edges is here opposite a portion 408B (shown in phantom in FIG. 4B) on the other side of the display surface 402. Thus, the portions 408A-B are also opposing portions of the parallel edges. A portion 410A that is between the portions 406A and 408A is opposite a portion 410B that is between the portions 406B and 408B. Thus, the portions 410A-B are also opposing portions of the parallel edges.

Figure 5:
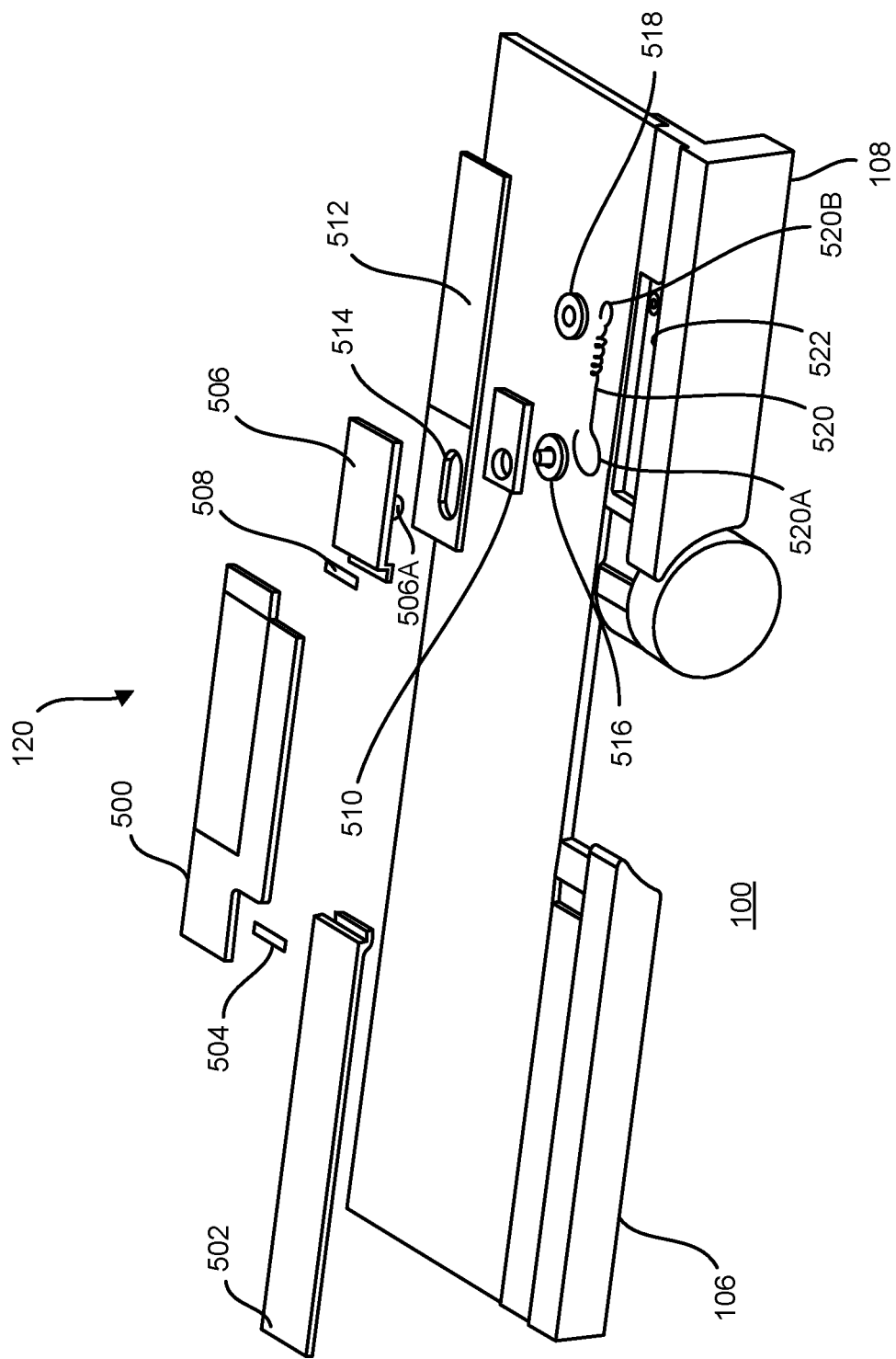
FIG. 5 shows an exploded view of the electronic device in FIG. 1 in an open state.

FIG. 5 shows an exploded view of the electronic device 100 of FIG. 1 in an open state. The flexible cover 120 here includes a cover member 500. The body portion 106 here includes a cover 502. The cover member 500 and the cover 502 may be attached to each other. For example, an adhesive 504 can be used for attachment. The flexible cover 120 here includes a slider structure 506. The cover member 500 and the slider structure 506 may be attached to each other. For example, an adhesive 508 can be used for attachment. The flexible cover 120 here includes a slider 510. The body portion 108 here includes a cover 512. A portion of the body portion 108 (e.g., a portion of the cover 512) may be sandwiched between the flexible cover 120 (e.g., the slider structure 506) and the slider 510.

The cover 512 here has a slot 514. In some implementations, the slot 514 can facilitate adjustability of the flexible cover 120 to account for the different lengths of the neutral axes 212, 214, and 216.

The electronic device 100 here includes a bolt 516. In some implementations, the bolt 516 may engage with the flexible cover 120 (e.g., with the slider structure 506, such as with a protrusion 506A thereof) to attach the slider 510 to the flexible cover 120. The electronic device 100 here includes a bolt 518. In some implementations, the bolt 518 may engage with the body portion 108.

The electronic device 100 here includes a spring 520. In some implementations, the spring 520 has an end 520A that may engage with the bolt 516. In some implementations, the spring 520 has an end 520B that may engage with the bolt 518.

The body portion 108 here includes a cavity 522. In some implementations, the cavity 522 may accommodate at least part of the flexible cover 120. For example, the slider 510, the spring 520, and the bolt 516 can be at least partially accommodated within the cavity 522. This may facilitate sliding of the slider 510 relative to the cover 512 (e.g., relative to the slot 514). In other implementations, a slot can be provided in some structure of the flexible cover 120 (e.g., in the slider 510) to facilitate corresponding sliding of the flexible cover relative to the cover 512.

The electronic device 100 is an example of an electronic device that includes: a processor (e.g., the processor 902 or 952 in FIG. 9); a memory (e.g., the memory 904 or 964 in FIG. 9); first and second body portions (e.g., the body portions 106 and 108) coupled to each other by a hinge (e.g., the hinge 110) having a single rotation axis; a flexible display (e.g., the flexible display 104) attached to at least one of the first or second body portions, the flexible display having parallel edges (e.g., the edges 404 in FIG. 4), the first body portion covering first opposing portions (e.g., the portions 408A-B) of the parallel edges, the second body portion covering second opposing portions (e.g., the portions 406A-B) of the parallel edges; and a flexible cover (e.g., the flexible cover 120) attached to the second body portion by a slot (e.g., the slot 514) on one of the second body portion or the flexible cover, the slot engaged with a protrusion (e.g., the protrusion 506A) on another of the second body portion or the flexible cover, the flexible cover extending to the first body portion and covering third opposing portions (e.g., the portions 410A-B) of the parallel edge.

In some implementations, a flexible cover (e.g., the flexible cover 120 in FIG. 1) may cover opposing portions of parallel edges (e.g., the portions 410A-B in FIG. 4). For example, the flexible cover 120 may be positioned adjacent the portions 410A-B so as to largely block the portions 410A-B from view. As another example, the flexible cover 120 may be positioned adjacent the portions 410A-B so as to protect the portions 410A-B from contact.

Figure 6:
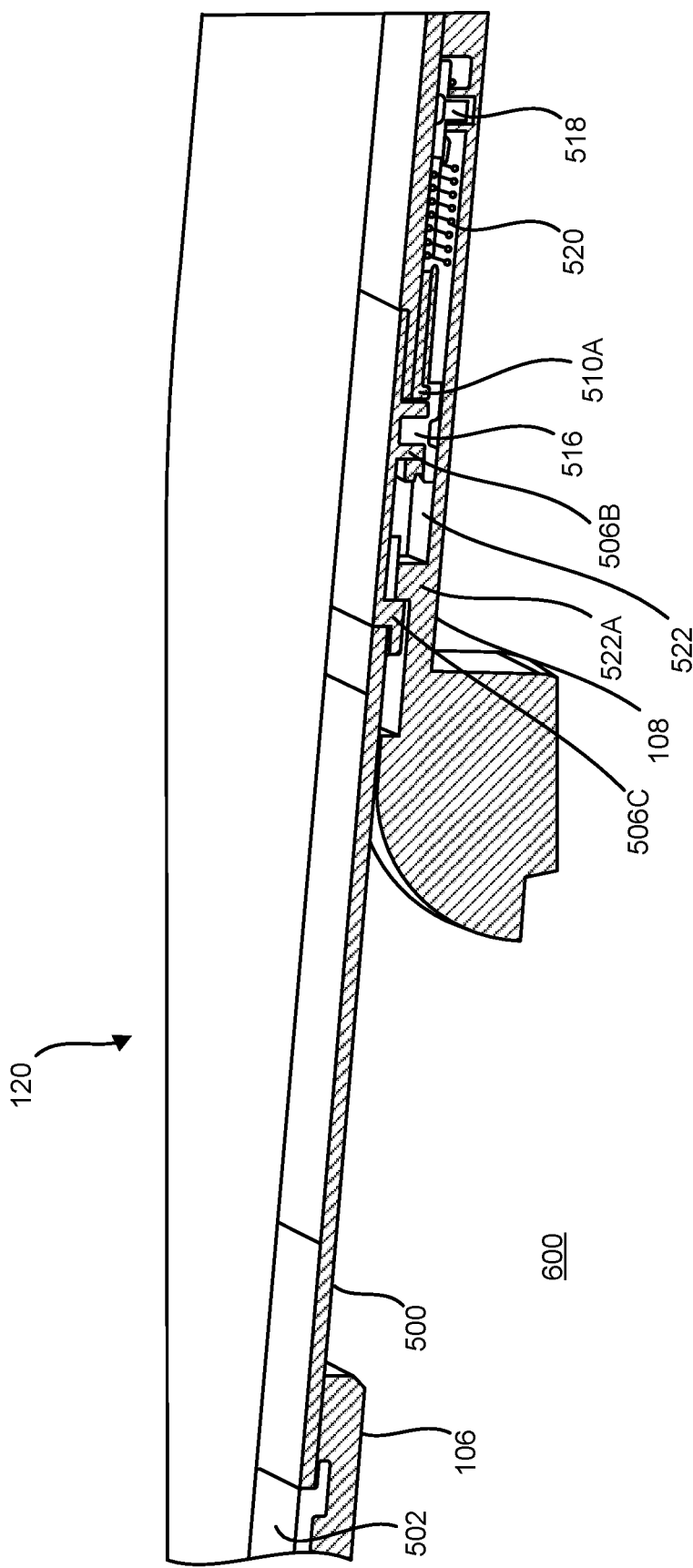
FIG. 6 schematically shows a cross-section of an example of a portion of an electronic device in an open state.

FIG. 6 schematically shows a cross-section of an example of a portion of an electronic device 600 in an open state. The electronic device 600 can be used together with one or more other examples described elsewhere herein. The electronic device 600 can be implemented based on some or all examples described with reference to FIG. 9.

The electronic device 600 is here shown to have the flexible cover 120 with the cover member 500 attached, at one of its ends, to the body portion 106 (e.g., to the cover 502 thereof), and coupled, at another of its ends, to the body portion 108 (e.g., by attachment to the slider structure 506).

The slider structure 506 here has a boss 506B. In some implementations, the boss 506B can be, or be part of, the protrusion 506A (FIG. 5). The bolt 516 may engage with the boss 506B. For example, the boss 516B may have threads that engage with threads on the bolt 516. The boss 506B may extend through the slot 514 (FIG. 5).

The slider 510 here has a boss 510A. In some implementations, the boss 510A can at least partially surround the boss 506B. For example, the bosses 510A and 506B may be concentric with each other. The bolt 516 may pass through either or both of the bosses 510A and 506B when engaging with the slider structure 506.

The spring 520 is here coupled to the bolt 516 and to the bolt 518. The contraction force of the spring 520 biases the flexible cover 120 toward the right in the present illustration. For example, a portion 506C of the slider structure 506 may abut an end 522A of the cavity 522 in the body portion 108.

The present example illustrates that the flexible cover 120 is attached to the body portion 108. For example, the cover member 500 is attached to the slider structure 506 which by way of the bolt 516 is coupled to the spring 529 which is attached to the body portion 108.

The present example illustrates that the flexible cover 120 is attached to the body portion 108 by the slot 514 (FIG. 5) on one of the body portion 108 or the flexible cover 120 (in FIG. 5, the slot 514 is on the cover 512 of the body portion 108), the slot engaged with the protrusion 506A in FIG. 5 (e.g., the boss 506B) on another of the body portion 108 or the flexible cover 120. That is, here the slot 514 is on the body portion 108 and the protrusion 506A is on the flexible cover 120.

The present example illustrates that the protrusion 506A includes the boss 506B, and that the electronic device 600 further includes the slider 510 attached to the boss 506B.

The present example illustrates that the boss 510A on the slider 510 may be concentric with the boss 506B.

Figure 7:
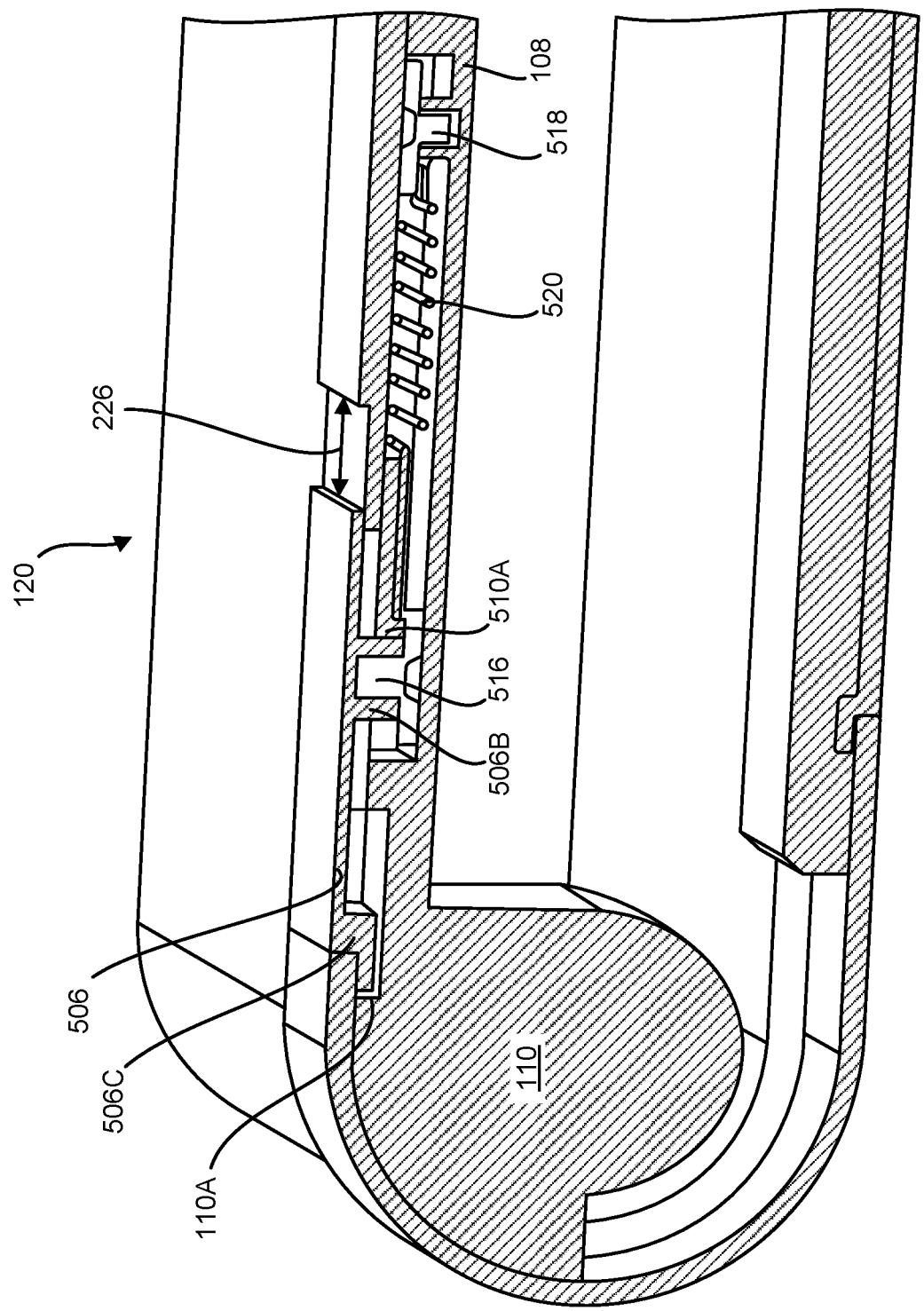
FIG. 7 schematically shows a cross-section of an example of a portion of an electronic device in a closed state.

FIG. 7 schematically shows a cross-section of an example of a portion of an electronic device 700 in a closed state. The electronic device 700 can be used together with one or more other examples described elsewhere herein. The electronic device 700 can be implemented based on some or all examples described with reference to FIG. 9.

Here, the closed state of the electronic device 700 has advanced the flexible cover 120 against the bias of the spring 520 to generate a gap corresponding to the distance 226. The slider structure 506 has been advanced to the left in the present illustration. For example, the portion 506C of the slider structure 506 now abuts a portion 110A of the hinge 110. The slider structure 506 acts, by the boss 506B, on the bolt 516, which is turn acting on the end of the spring 520 to extend the same relative to the body portion 108.

Figure 8:
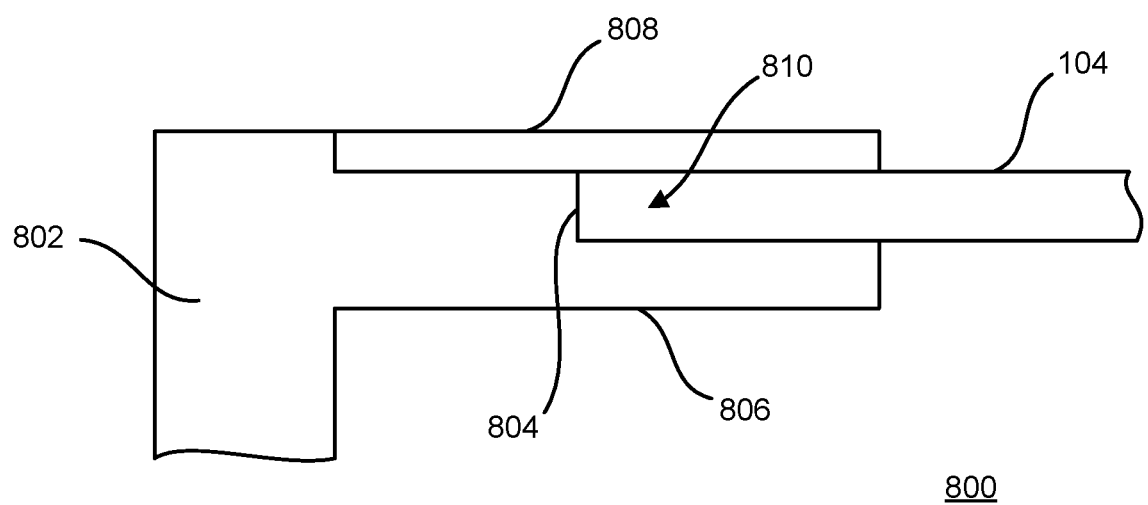
FIG. 8 shows a cross-section of an example of a portion of an electronic device.

FIG. 8 shows a cross-section of an example of a portion 800 of an electronic device. The portion 800 can be used together with one or more other examples described elsewhere herein.

The portion 800 includes a body portion 802 and the flexible display 104, only part of which is shown. In some implementations, the body portion 802 may be the body portion 106 (see, e.g., FIG. 1). For example, the body portion 802 can be positioned on either or both opposing sides of the flexible display 104 to serve as the body portion 106. In some implementations, the body portion 802 may be the body portion 108 (see, e.g., FIG. 1). For example, the body portion 802 can be positioned on either or both opposing sides of the flexible display 104 to serve as the body portion 108.

The flexible display 104 includes an edge perpendicular to its display surface, and a portion 804 of the edge is visible in the illustration. In some implementations, the portion 804 corresponds to one of the portions 406A-B (FIG. 4) that form opposing portions of the parallel edges. In some implementations, the portion 804 corresponds to one of the portions 408A-B (FIG. 4) that form opposing portions of the parallel edges. The body portion 802 includes a member 806 extending parallel to and supporting the portion 804 of the flexible display 104.

The portion 800 includes a cover 808 adjacent the member 806. In some implementations, the cover 808 corresponds to the cover 502 (FIG. 5) and can be coupled to the body portion 106. In some implementations, the cover 808 corresponds to the cover 512 (FIG. 5) and can be coupled to the body portion 108. The member 806 and the cover 808 form a slot 810 for the portion 804 (e.g., for the opposing portions of the parallel edges). In some implementations, each of the body portions 106 (FIGS. 1) and 108 has corresponding ones of the portion 800. Thus, the portion 800 in this example covers the portion 804 by providing the slot 810 that accommodates the portion 804.

Figure 9:
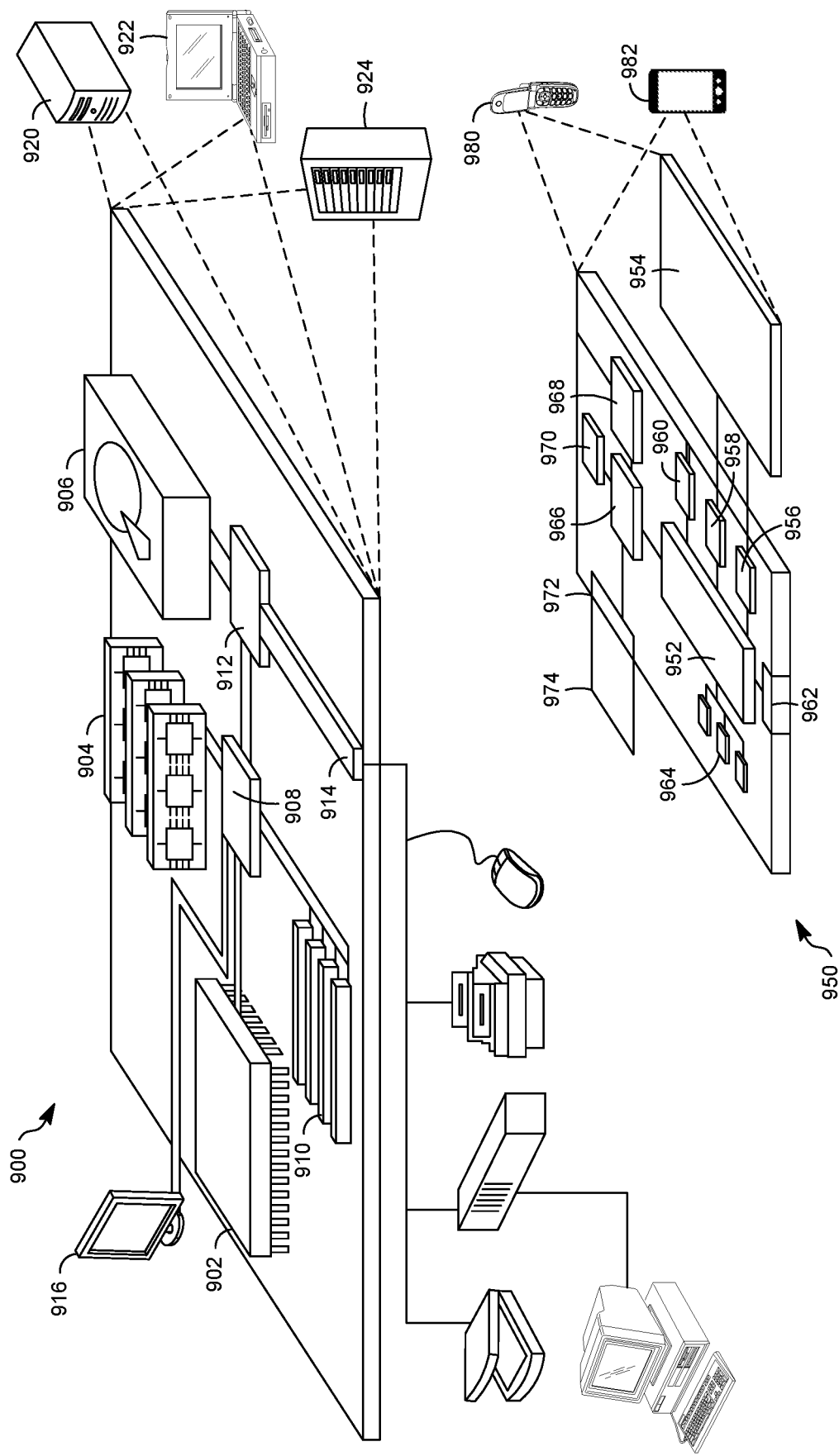
FIG. 9 shows an example of a computer device and a mobile computer device that can be used to implement the techniques described here.

FIG. 9 shows an example of a generic computer device 900 and a generic mobile computer device 950, which may be used with the techniques described here. Computing device 900 is intended to represent various forms of digital computers, such as laptops, desktops, tablets, workstations, personal digital assistants, televisions, servers, blade servers, mainframes, and other appropriate computing devices. Computing device 950 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. The processor 902 can be a semiconductor-based processor. The memory 904 can be a semiconductor-based memory. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provided in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provided as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. An electronic device comprising:
a processor;
a memory;
first and second body portions coupled to each other by a hinge having a single rotation axis, wherein the first body portion comprises first members adjacent to respective first covers to form respective first slots, and wherein the second body portion comprises second members adjacent to respective second covers to form respective second slots;
a flexible display attached to at least one of the first or second body portions, the flexible display having parallel edges, the first body portion covering first opposing portions of the parallel edges in the respective first slots, the second body portion covering second opposing portions of the parallel edges in the respective second slots; and
flexible covers attached to the first body portion, each of the flexible covers comprising a respective cover member, wherein each of the cover members is a single member that is configured to occupy planar and non-planar configurations, wherein each of the single members extends from the first body portion to the second body portion, and wherein the flexible covers cover respective third opposing portions of the parallel edges.

2. The electronic device of claim 1, wherein the flexible cover is attached to the second body portion.

3. The electronic device of claim 2, wherein the flexible cover is attached to the second body portion by an opening on one of the second body portion or the flexible cover, the opening engaged with a protrusion on another of the second body portion or the flexible cover.

4. The electronic device of claim 3, wherein the opening is on the second body portion and the protrusion is on the flexible cover.

5. The electronic device of claim 4, wherein the protrusion includes a first boss, the electronic device further comprising a slider attached to the first boss.

6. The electronic device of claim 5, wherein a portion of the second body portion is sandwiched between the flexible cover and the slider.

7. The electronic device of claim 6, further comprising a second boss on the slider, the second boss concentric with the first boss.

8. The electronic device of claim 5, further comprising a bolt that engages with the first boss to attach the slider.

9. The electronic device of claim 4, further comprising a spring having a first end engaged with the protrusion and a second end connected to the second body portion.

10. The electronic device of claim 1, wherein the flexible cover comprises a cover member and a slider structure, the slider structure coupled to the second body portion.

11. The electronic device of claim 10, further comprising a slider attached to the slider structure, a portion of the second body portion sandwiched between the slider structure and the slider.

12. An electronic device comprising:
a processor;
a memory;
first and second body portions coupled to each other by a hinge having a single rotation axis;
a flexible display attached to at least one of the first or second body portions, the flexible display having parallel edges, the first body portion covering first opposing portions of the parallel edges, the second body portion covering second opposing portions of the parallel edges; and a flexible cover attached to the first body portion, the flexible cover extending to the second body portion and covering third opposing portions of the parallel edges;

wherein the first body portion comprises:

a first member extending parallel to and supporting the first opposing portions of the parallel edges;

a first cover adjacent the first member, the first member and the first cover forming a slot for the first opposing portions of the parallel edges; and wherein the second body portion comprises:

a second member extending parallel to and supporting the second opposing portions of the parallel edges; and a second cover adjacent the second member, the second member and the second cover forming a slot for the second opposing portions of the parallel edges.

13. An electronic device comprising:

a processor;

a memory;

first and second body portions coupled to each other by a hinge having a single rotation axis;

a flexible display attached to at least one of the first or second body portions, the flexible display having parallel edges, the first body portion covering first opposing portions of the parallel edges, the second body portion covering second opposing portions of the parallel edges;

flexible covers attached to the second body portion, each of the flexible covers attached by an opening on one of the second body portion or the flexible cover, the opening engaged with a protrusion on another of the second body portion or the flexible cover, the protrusion having a first boss, each of the flexible covers including a respective single member extending from the second body portion to the first body portion, wherein the flexible covers cover respective third opposing portions of the parallel edges;

a slider attached to the first boss, wherein a portion of the second body portion is sandwiched between the flexible cover and the slider;

a bolt that engages with the first boss to attach the slider; and a second boss on the slider, the second boss concentric with the first boss.

14. The electronic device of claim 13, wherein the opening is on the second body portion and the protrusion is on the cover.

15. The electronic device of claim 14, further comprising a spring having a first end engaged with the protrusion and a second end connected to the second body portion.

16. An electronic device comprising:

a processor;

a memory;

first and second body portions coupled to each other by a hinge having a single rotation axis, wherein the first body portion comprises first members adjacent to respective first covers to form respective first slots, and wherein the second body portion comprises second members adjacent to respective second covers to form respective second slots;

a flexible display attached to at least one of the first or second body portions, the flexible display having parallel edges, the first body portion covering first opposing portions of the parallel edges in the respective first slots, the second body portion covering second opposing portions of the parallel edges in the respective second slots; and a flexible cover attached to the second body portion by a slot on one of the second body portion or the flexible cover, the slot engaged with a protrusion on another of the second body portion or the flexible cover and configured to facilitate adjustability of a length of the flexible cover to account for differences between the flexible cover and flexible display in transitioning between open and closed states of the electronic device, the flexible cover extending to the second body portion and covering third opposing portions of the parallel edges.

* * * * *